Jan. 16, 1934.   F. HODGKINSON   1,943,891
BEARING CONSTRUCTION
Filed Sept. 21, 1931   2 Sheets-Sheet 1
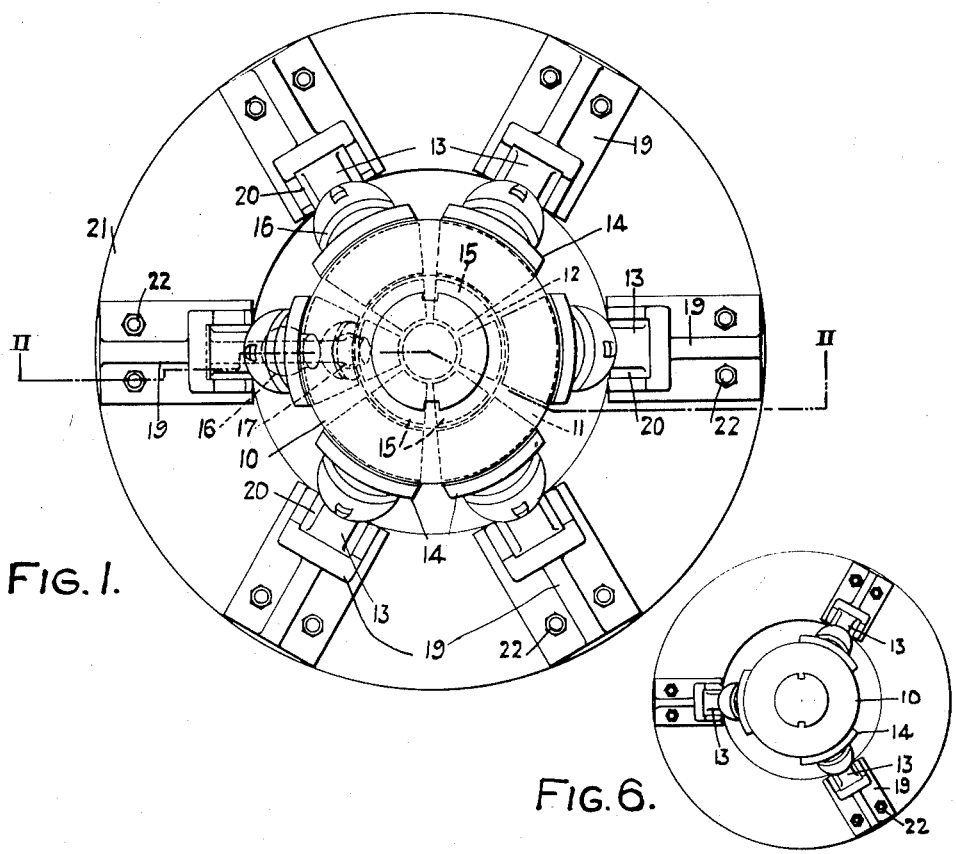
FIG.1.
FIG.6.
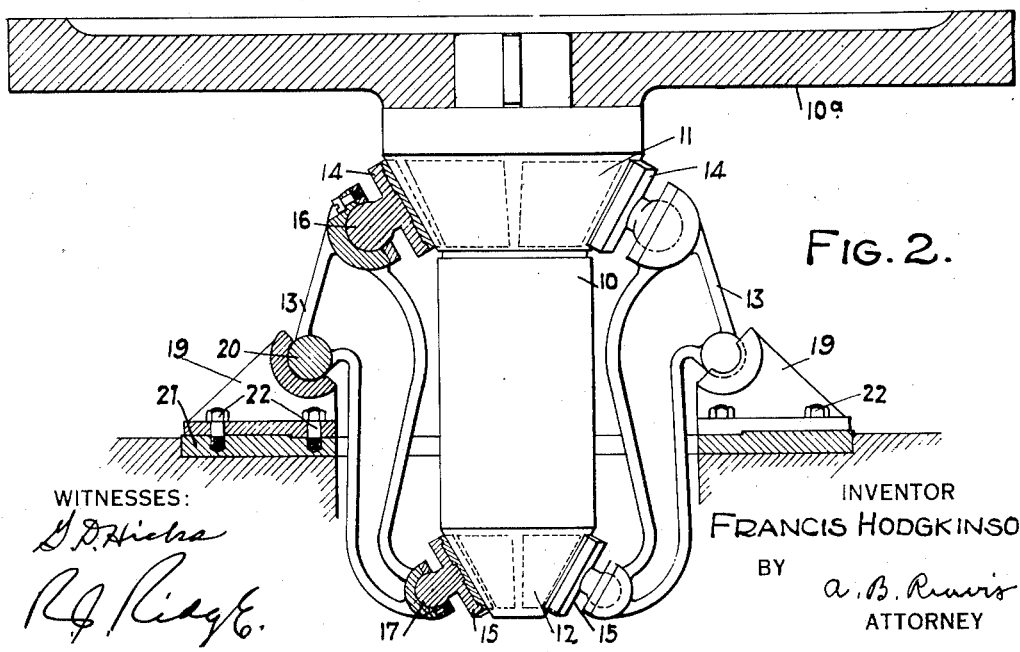
FIG.2.
WITNESSES:
INVENTOR
FRANCIS HODGKINSON.
BY
ATTORNEY Jan. 16, 1934.   F. HODGKINSON   1,943,891
BEARING CONSTRUCTION
Filed Sept. 21, 1931   2 Sheets-Sheet 2

INVENTOR
FRANCIS HODGKINSON.
ATTORNEY

Patented Jan. 16, 1934

1,943,891

UNITED STATES PATENT OFFICE 1,943,891

BEARING CONSTRUCTION

Francis Hodgkinson, Philadelphia, Pa., assignor to Westinghouse Electric & Manufacturing Company, a corporation of Pennsylvania Application September 21, 1931
Serial No. 564,237

6 Claims. (Cl. 308—160)

My invention relates to bearings and in particular to bearings for maintaining vertical shafts in position. In applications of this character, for example, the main shaft of vertical boring mills, gear cutters and the like, it is desirable that the shaft rotate without wobble in order to prevent inaccuracies in the work performed by the machine. Heretofore, where a vertical shaft operated with a steady and a thrust bearing, the steady bearing required constant attention to maintain a minimum clearance between the shaft and bearing to prevent wobble of the shaft.

It is an object of my invention to provide a bearing that will adjust itself in service to maintain the axis of the shaft in its original position and to compensate for wear and to operate with the minimum oil film thickness corresponding to the load and speed and so prevent wobble of the shaft.

It is a further object to provide a bearing that functions as a combined thrust and steady bearing and which will be reliable in operation and easy to construct.

These and other objects are effected by my invention, as will be apparent from the following description and claims taken in connection with the accompanying drawings, in which:

Fig. 1 is a plan view of a bearing constructed in line with my invention, certain parts being removed for clearness;

Fig. 2 is a sectional view taken on line II—II of Fig. 1.

Figure 3:
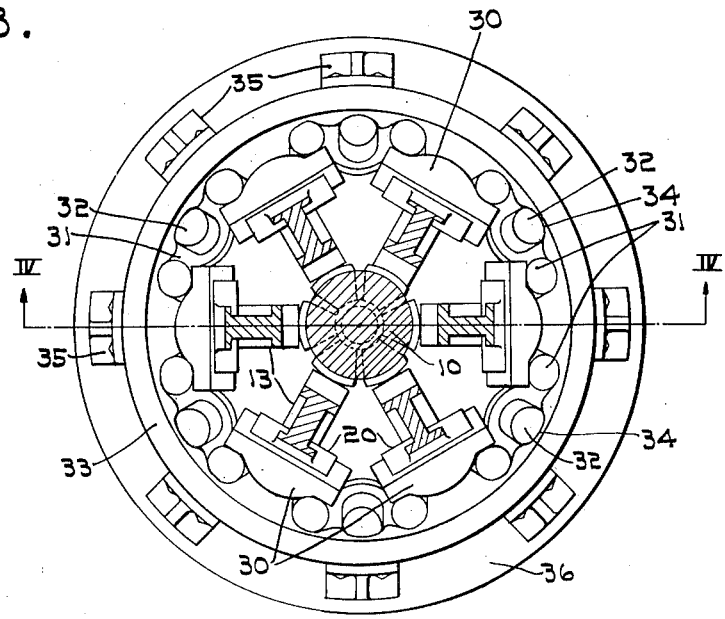
Fig. 3 is a plan view in section of a modification of the bearing shown in Figs. 1 and 2 and is taken on the line III—III of Fig. 4.

Referring now in detail to the drawings, I provide a shaft 10, carrying a rotatable member 10a, with its axis in a substantially vertical position, and having upper and lower frusto-conical shaped journal portions 11 and 12, respectively. The shaft 10 is supported by a plurality of supporting structures or levers indicated generally by the reference numeral 13. The supporting structures 13 are provided with upper and lower bearing segments 14 and 15 fitting the journal portions 11 and 12, respectively. The segments 14 and 15 are pivotally connected to the supporting members or levers 13 by the ball-and-socket connections 16 and 17.

The levers 13 are carried by brackets 19 through fulcrums 20, about which the levers are free to rock. The brackets 19 are disposed about the axis of the shaft 10 and may be tied together by means of a foundation ring 21 to which all of the brackets 19 are fastened by bolts 22.

Thus the upper and lower annular groups of bearing segments 14 and 15 are pivotally carried by the annular group of levers 13, the upper group of segments 14 engaging the upper journal portion 11 and the lower group of bearing segments 15 engaging the lower journal portion 12.

The upper journal portion 11 and the lower journal portion 12 may be of the same size. It is generally convenient to make one journal larger than the other; the larger of the journals being determined by the direction of insertion of the shaft 10, the direction of load and other mechanical considerations. The larger of the two conical journal portions provides more area of bearing surface. Therefore, I locate the pivot 20 asymmetrically for the purpose of securing approximately equal load per unit area of surface on upper and lower groups of bearing surfaces.

In the illustration of Fig. 2, I have shown the shaft 10 inserted from above, the load downward, the upper conical journal the larger of the two, and the location of pivot 20 so that the major portion of load is carried on the larger conical journal.

It will be observed that the bearing segments 14 and 15 are held in engagement with their respective journals by the weight of the rotating element, which latter includes the shaft 10, the element 10a carried thereby and the load that may be upon it. With the load symmetrical about the axis, the lubricant film thickness will be a minimum and remain constant, the shaft revolving, therefore, with any given condition of load continuously about the same axis and with no clearance to permit wobble. Furthermore, as the bearing surfaces including those of the segments 14 and 15 and the frusto-conical bearing surfaces 11 and 12 wear in service, instead of clearance developing, as in prior arrangements, the shaft 10 moves axially slightly to maintain the bearing surfaces in engagement, wear being automatically taken up, the levers 13 distributing the load and rocking to maintain the bearing surfaces engaging and carrying their proportion of the load.

An embodiment of my invention is shown in

Figure 4:
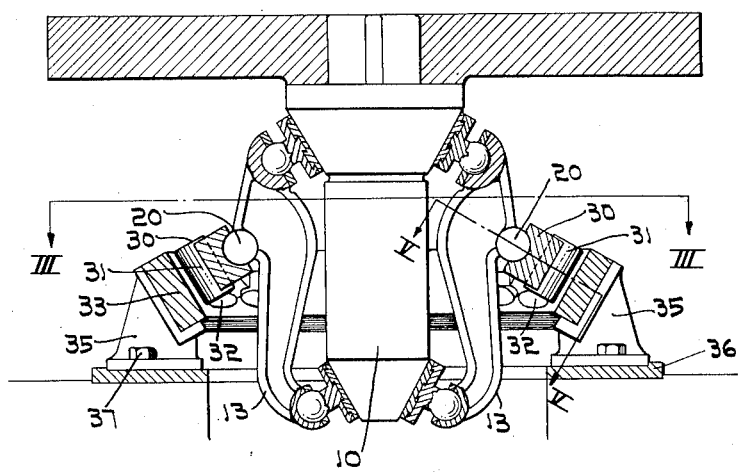
Fig. 4 is a sectional view taken on line IV—IV of Fig. 3.
Figure 5:
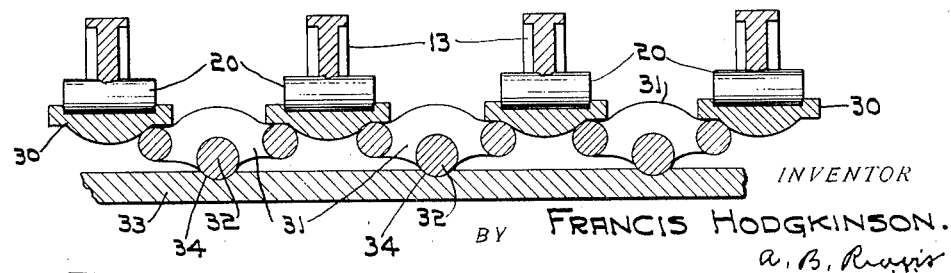
Fig. 5 is a fragmentary sectional view in development of the bearing shown in Figs. 3 and 4 and is taken on line V—V of Fig. 4; and, Fig. 6 is a plan view of a modification of the bearing shown in Fig. 1.

Figs. 3 to 5 in which the fulcra 20 are supported by a plurality of blocks 30 about which the levers 13 are free to rock. Arranged about the axis of the shaft 10 is a series of equalizing rockers 31, the ends of which engage and support the adjacent ends of adjacent blocks 30. The rockers 31 have pivots 32, disposed intermediate the ends thereof, and are carried by a ring 33 having seats 34 in which the pivots 32 are mounted so that relative movement between the rockers 31 and the ring 33 is provided. The ring 33 is supported by brackets 35 which are tied together by a foundation ring 36 to which all of the brackets 35 are fastened by any convenient means such as, for example, bolts 37.

The bearing construction in this embodiment provides the advantages referred to in connection with the bearing shown in Figs. 1 and 2 and it further provides for equal distribution of load among the various levers 13. Should the load carried by one or more of the levers 13 decrease for any reason, the additional load on the remaining levers 13 would cause them to move outwardly slightly. Movement would be transmitted to the blocks 30 through the pressure equalizing system of rockers 31 until such movement positions the levers 13 to equally divide the load therebetween. It will be obvious that in this embodiment, as in the previous one, the load per unit of bearing area on both the upper and the lower bearings is approximately equal and is governed by the location of the fulcrum 20 with respect to the bearing segments 14 and 15.

A further modification of my invention is shown in Fig. 6. In this figure, I have shown a bearing constructed somewhat the same as the bearing shown in Fig. 1, the difference being that three levers 13, instead of six, are employed for supporting the bearing segments and the shaft. With this construction, as in the prior modification, I secure approximately equal load per unit of bearing area on both the upper and the lower groups of bearing segments. Furthermore, I also provide for equal distribution of load among the levers 13, as a three-point supporting construction of this character is inherently capable of dividing the load among the three supporting points.

While I have shown my invention in three forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a bearing, the combination of a substantially vertical shaft having axially spaced, upper and lower frustro-conical journal portions, upper and lower groups of bearing segments arranged about the axis of the shaft and engaging respectively the upper and lower journal portions, and common means for supporting the upper and lower segments and for maintaining contact thereof with the respective journal portions and providing for distribution of load between the upper and the lower groups of segments.

2. The combination of a substantially vertical shaft having upper and lower frustro-conical journal portions, upper and lower groups of bearing segments disposed about the axis of said shaft and engaging, respectively, the upper and lower journal portions, a plurality of levers disposed about the axis of the shaft having pivots adjacent their ends for supporting a segment of each group, and a fulcrum for supporting each lever disposed intermediate the pivots.

3. In a combined thrust and steady bearing, the combination of a substantially vertical shaft having an upper frustro-conical journal portion and a relatively smaller lower frustro-conical journal portion, upper and lower annular groups of bearing segments engaging, respectively, the upper and lower journal portions, an annular group of levers pivotally supporting the upper and lower segments, and fulcra for supporting said levers disposed intermediate the upper and lower bearing segments and relatively close to the upper segments.

4. The combination of a substantially vertical shaft having upper and lower frustro-conical journal portions, upper and lower groups of bearing segments disposed about the axis of said shaft and engaging, respectively, the upper and lower journal portions, a plurality of levers disposed about the axis of the shaft having pivots adjacent their ends for supporting a segment of each group, a fulcrum for supporting each lever disposed intermediate the pivots, and means for equally distributing the load to the fulcra.

5. The combination of a substantially vertical shaft having upper and lower frustro-conical journal portions, upper and lower groups of bearing segments disposed about the axis of said shaft and engaging, respectively, the upper and lower journal portions, a plurality of levers disposed about the axis of the shaft having pivots adjacent their ends for supporting a segment of each group, an annularly disposed group of blocks for pivotally supporting said levers intermediate their ends, equalizing rockers for supporting adjacent ends of adjacent blocks, and means for pivotally supporting said rockers intermediate their ends.

6. The combination of a substantially vertical shaft having upper and lower frustro-conical journal portions, upper and lower groups of three bearing segments each disposed about the axis of the shaft and engaging, respectively, the upper and lower journal portions, three levers arranged about the axis of the shaft having pivots adjacent their ends for supporting a segment of each group, and a fulcrum for each lever disposed intermediate the pivots.

FRANCIS HODGKINSON.